C. R. HUNT.
MACHINE FOR PREPARING ROAD PAVING AND SURFACING MATERIAL.
APPLICATION FILED DEC. 26, 1916. RENEWED MAY 14, 1918.
1,278,662.
Patented Sept. 10, 1918.
3 SHEETS—SHEET 1.
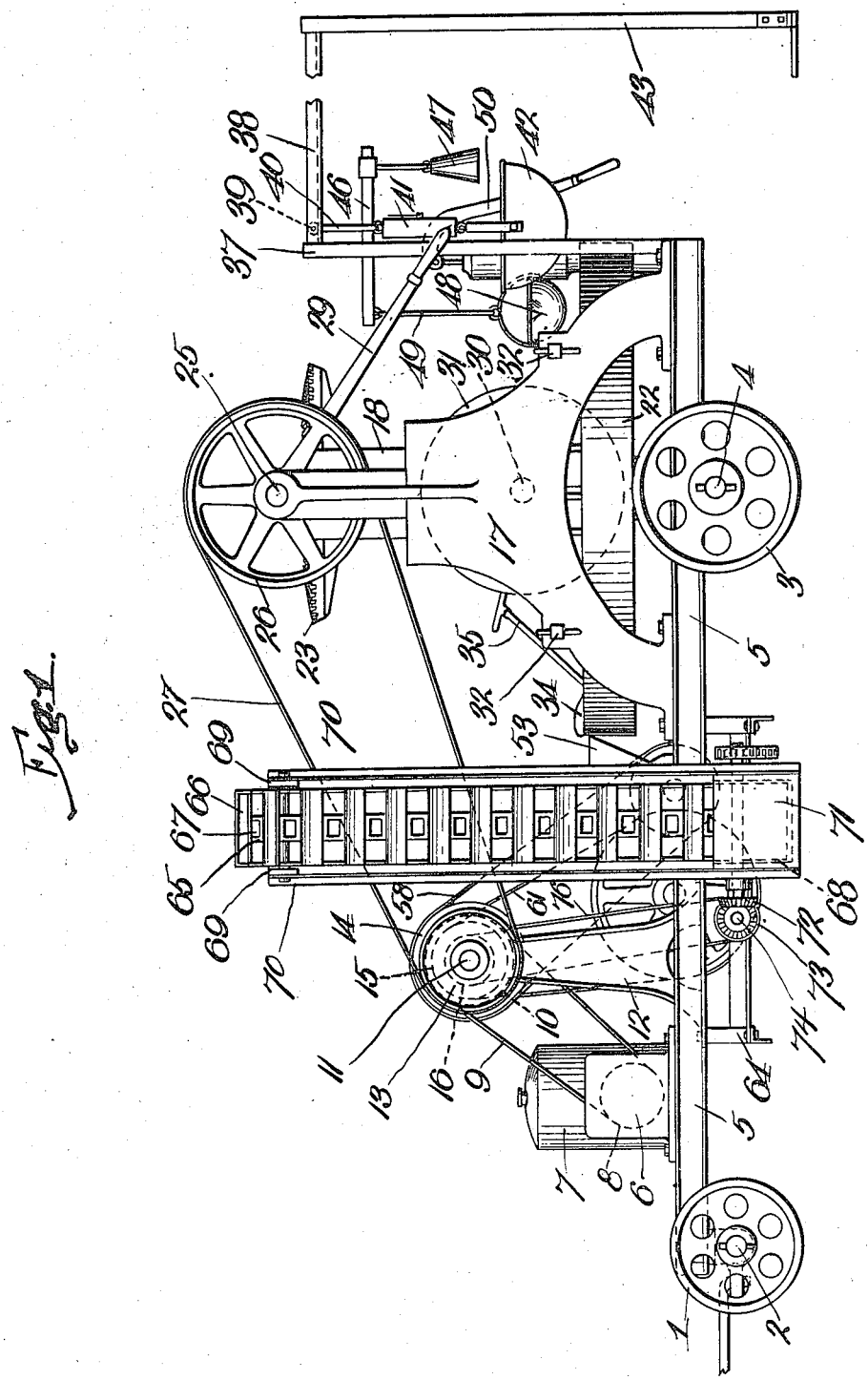
WITNESS
INVENTOR,
Calvert R. Hunt.
BY
George J. Thorpe ATTORNEY

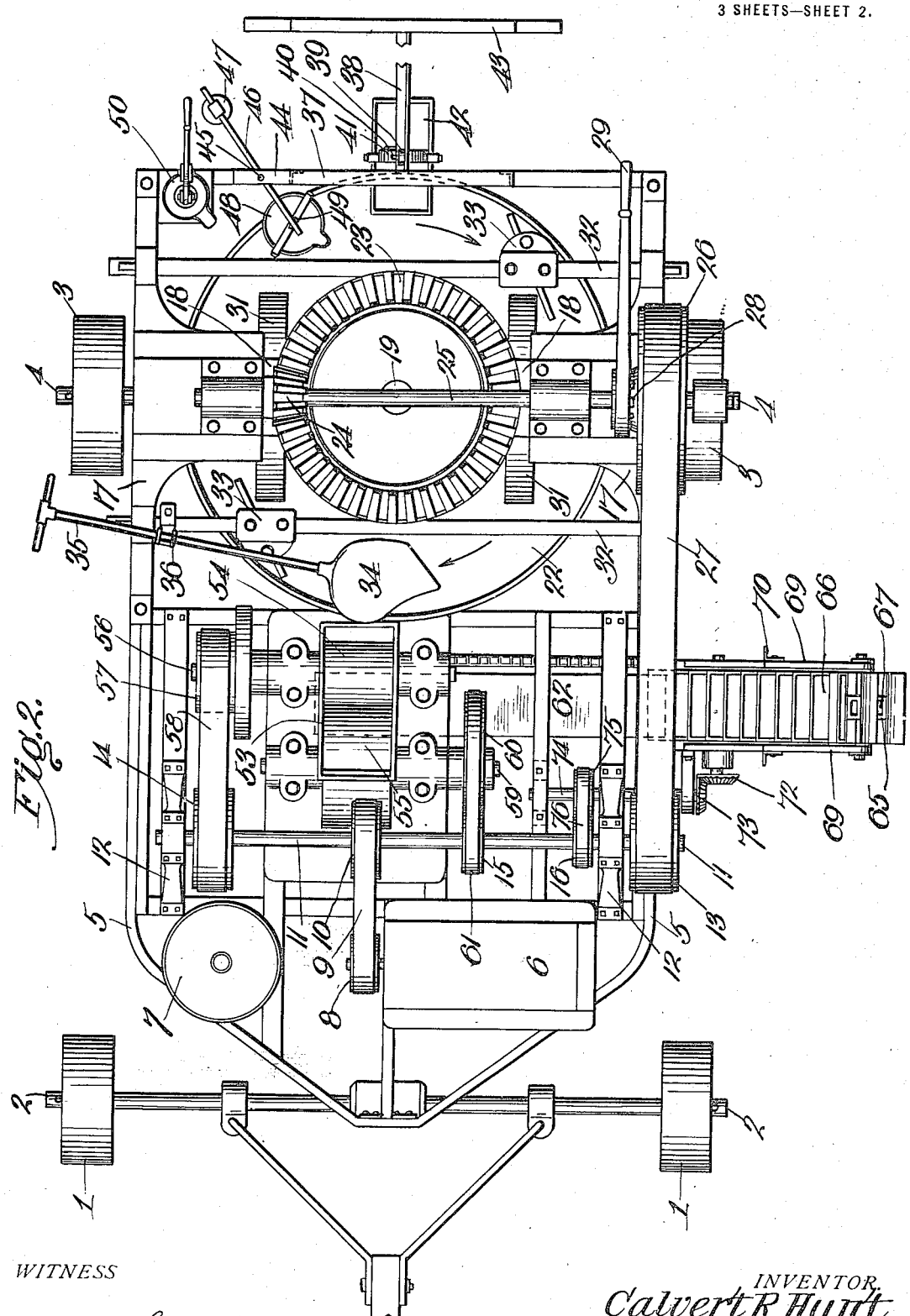

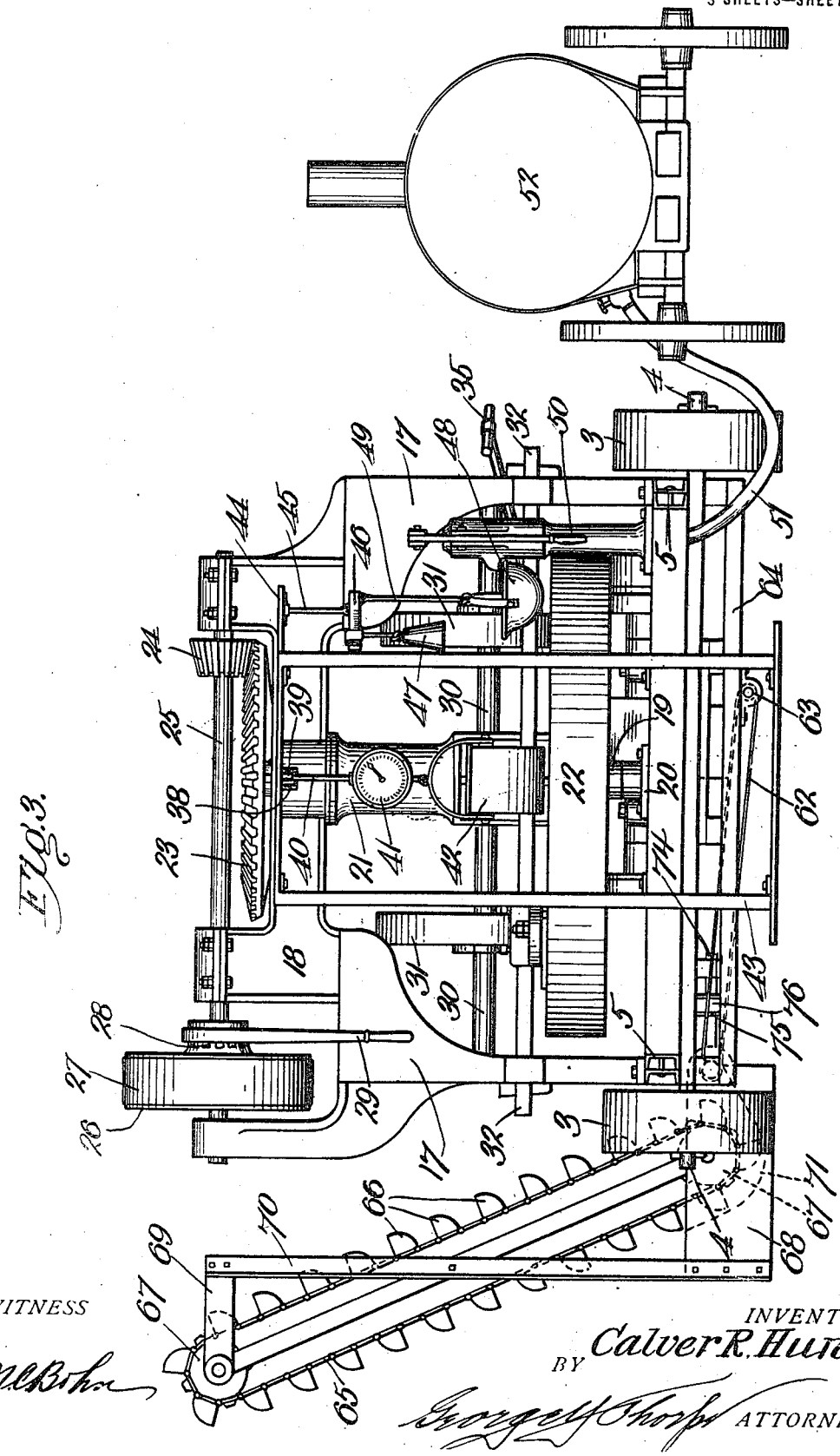

UNITED STATES PATENT OFFICE.

CALVERT R. HUNT, OF OSCEOLA, MISSOURI.

MACHINE FOR PREPARING ROAD PAVING AND SURFACING MATERIAL.

1,278,662.  Specification of Letters Patent.  Patented Sept. 10, 1918.

Application filed December 26, 1916, Serial No. 139,026. Renewed May 14, 1918. Serial No. 235,212.

*To all whom it may concern:*

Be it known that I, CALVERT R. HUNT, a citizen of the United States, residing at Osceola, in the county of St. Clair and State of Missouri, have invented certain new and useful Improvements in Machines for Preparing Road Paving and Surfacing Material, of which the following is a specification.

This invention relates to an apparatus for preparing material for the construction and surfacing of roads and the like, and my object is to produce a plant or machine by which earth or granular material or earth and granular material in predetermined quantity and without preliminary heating can be thoroughly pulverized and intimately, uniformly and economically mixed with a predetermined quantity of any binder, preferably asphaltum, to form a homogeneous mass impervious to water and having tough and tenacious properties, and by which the product shall be discharged in a stream.

Another object is to produce a machine of the character outlined by which the proportions of the various materials to be incorporated in and constitute the paving or surfacing product may be accurately determined so that the variation in the earthy or granular materials and in their condition may be compensated for by variations in the quantity of binder to be mixed therewith.

A further object is to produce a machine which is self-contained and which is of simple, compact, and comparatively inexpensive construction.

With these general objects in view and others as hereinafter appear, the invention consists in a novel combination of parts as hereinafter described and pointed out in the appended claims, and in order that it may be fully and clearly understood, reference is to be had to the accompanying drawings, in which—

Figure 1, is a side elevation of a machine embodying the invention.

Fig. 2, is a top plan view of the machine.

Fig. 3, is a rear view of the machine and also of a portable wagon for supplying a liquid binder to the machine.

In the said drawings, 1 indicates the front wheels mounted on a pivoted axle 2, and 3 the rear wheels mounted on an axle 4, and mounted on said axles in any convenient manner is the skeleton bed or frame 5 of the machine. Mounted on the front end of said bed is an engine 6 and a tank 7 for supplying fuel for the engine, a drive pulley 8 being mounted on the shaft of the engine and connected by a belt 9 to a pulley 10 mounted on a counter shaft 11, which shaft preferably extends transversely of the bed and is journaled in suitable bearing standards 12. The countershaft is equipped with a series of pulleys 13, 14, 15 and 16 for power transmission purposes, as hereinafter explained.

Mounted on the rear end of the bed is a machine for grinding and kneading earthy or granular material, such as clay, shale rock or the like. This machine may be of any conventional type, that illustrated being briefly described as follows:—

17 is a pair of side frames connected at their upper ends by a cross member 18. 19 is a vertical shaft journaled at its lower end in a step bearing 20 and at its upper end in the cross member 18 centrally between the sides 17, the shaft being preferably inclosed within a housing 21. Secured rigidly on the shaft 19 is a shallow circular pan 22, and to rotate the shaft and pan, the former is equipped at its upper end with a large miter gear 23 meshing with a drive pinion 24 rigidly mounted on a shaft 25 journaled on the cross member 18. The shaft 25 is equipped with a pulley 26 connected by a belt 27 with the drive pulley 13 on the counter shaft 11, pulley 26 being thrown in and out of service with shaft 25 through the medium of a suitable clutch 28 operated by a lever 29.

30 is a pair of transverse shafts arranged diametrically of and above the pan and journaled at their outer ends in sides 17 and at their inner ends in the housing 21, and adjustably secured on said shafts in any suitable manner is a pair of circular mullers or grinding wheels 31, the same extending into the pan and adapted to be turned through frictional contact with the earthy or other material in the pan under the rotation of the latter.

32 is a pair of cross bars secured to the sides of the frame and extending above the pan 22 and mounted adjustably upon said cross bars is a pair of scrapers 33, said scrapers extending down into the pan and being set at proper angles to deflect the material in the pan toward the center of the latter so that all of such material shall be subjected to the grinding and kneading action of the mullers.

34 is a scoop or shovel provided with a handle 35 extending beyond the rim of the machine, said handle extending slidingly through a bracket 36 mounted on one of the cross bars 32. The handle is capable of rotation in the bracket and the latter is swiveled so that by applying pressure on the outer end of the handle the scoop or shovel can be raised and tilted in such a manner that it will gather up the material ground in the pan and elevate it over the rim of the pan and into the disintegrator, hereinafter referred to. As the particular construction and operation of the shovel is not novel and forms a part of a standard make of machine, it is not detailed.

Mounted upon the rear end of frame 5, is a vertical frame 37, and said frame is provided with a rearwardly projecting track 38 upon which is mounted a roller or trolley wheel 39, and suspended from said roller or trolley wheel by a rod 40 is a measuring device in the form of a weighing scale 41, and a bucket 42. Into this bucket the material is shoveled so that it may be weighed or measured preliminary to depositing it in the pan, the bucket being suitably suspended from the scale so that it is capable of being tilted. A weighing bucket of the character described is not novel *per se* and is not detailed.

The track is provided so that the weighing bucket may be run back from the machine where it may be conveniently charged. If the track is of such length that it cannot be properly and conveniently braced from the machine, it is desirable to provide a ground support at its rear end, this support being shown as a vertical standard or frame 43 resting on the ground and detachably bolted or otherwise secured to the rear end of the track. When the bucket is loaded it is run to the front end of the track and tilted forwardly so that its contents shall be discharged into the pan.

For supplying the pan with the binder in proper proportion to the amount of earthy or granular material dumped into the pan, a measuring device in the form of a weighing scale is suspended from a lateral extension 44 of frame 37 (see Fig. 3) said scale comprising a suspension rod 45, a scale beam 46, an adjustable weight 47 at one side of the fulcrum point of the scale beam and a weighing cup 48 suitably attached to a rod 49 suspended from the scale beam at the opposite side of the fulcrum point thereof. There is nothing specifically new in this weighing scale and the same is therefore not detailed. It is charged with the binder by any suitable means, and I have illustrated a hand pump herein as such means, this pump, numbered 50 is mounted on the bed of the machine and is equipped with a hose 51 for detachable connection with a tank 52, this tank preferably constituting a part of a wagon as shown, as it will usually be found more convenient to convey the binder to the machine than to equip the latter with a large reservoir.

If a liquid binder is used, it will be pumped into the cup 48 and dumped into the pan by simply tilting the cup and the rotation of the pan charged with the earthy material or the like, will very quickly effect the complete amalgamation of the binder and earthy material or the like, the product being a dense plastic homogeneous substance. When the material and binder are thoroughly mixed, the operator will manipulate the shovel or scoop to cause the material in the pan to be deflected upward and over the rim of the pan at the front side thereof in a manner similar to earth passing over a plowshare, the product dropping into the hopper of a disintegrator 53, mounted on the bed. This disintegrator may be of any suitable type, but is shown as provided with two crushing rollers 54 and 55, roller 54 being mounted on a shaft 56 equipped with a belt wheel 57 connected by a belt 58 with power transmission pulley 14. The shaft 59 of roller 55 is equipped with a belt wheel 60 connected by a belt 61 with the power transmission pulley 15. These rollers insure the complete pulverization of any particles of rock or any other hard substance which may have escaped pulverization in the pan so that the material discharged from the disintegrator shall be dense and plastic. The mixture will likewise possess the desirable quality of adhesiveness so that it shall not crumble, and the property of being impervious to penetration by frost or water.

As the mixed material possessing the qualities set forth is discharged from the disintegrator, it falls upon a horizontal conveyer 62 mounted at its opposite ends upon shafts 63 suitably journaled in a sub-frame 64 underlying and depending from the bed.

It will be understood that the product is never produced while the machine is traveling along a road but that it can be produced at any point on or off the road, where the supply of earthy or granulated material is accessible.

Before beginning the operation of the machine, an elevator is attached to it for receiving the material from conveyer 62 and elevating it for discharge upon the ground or into any desired receptacle. This elevator is of the endless type, preferably comprising a chain 65 equipped with buckets 66, the chain engaging sprocket wheel 67 on the upper and lower shafts and the lower sprocket wheel is journaled in the walls 68 of a frame or foot secured to the bed adjacent the outer end of conveyer 62. The shaft of sprocket 67 is journaled in arms 69 of standards 70 secured rigidly at their lower ends to the walls 68 of said frame and within the frame is a receptacle 71 for receiving the material discharged by conveyer 62, so that the buckets 66 shall be charged as they successively pass through said receptacle. The lower shaft of the conveyer 65 is provided with a bevel gear 72 meshing with a bevel gear 73 on the outer end of a shaft 74 suitably journaled and equipped with a belt wheel 75 connected by a driving belt 76 to the power transmission wheel 16 on countershaft 11.

As the operation of the various parts has been described in detail it is not deemed necessary to recapitulate the operation. The machine may be moved from place to place by means of draft animals or by any motive power.

From the above description it will be apparent that I have produced a machine or plant for producing a paving mixture which takes the earthy or granular material in its natural state, either dry or moist and thoroughly mixes it with a binder of the character described, in a most efficient, uniform, rapid and economical manner, and that the machine in addition to possessing the desirable features of simplicity and compactness, embodies in its construction equipment for performing its various functions which is of standard construction and therefore of known practicability, though it is to be understood that I do not restrict myself to the particular kind of pan mixer or disintegrator illustrated and described, nor to other details of construction which are obviously susceptible of modification within the spirit and scope of the appended claims.

I claim:

1. A machine for preparing road paving material, comprising a pan, crushing mechanism in the pan, a disintegrator, means for discharging mixed material from the pan into the disintegrator, means for conveying material as it is discharged from the disintegrator to an elevated point of discharge, a motor mounted on the machine, and means for transmitting power from said motor to operate the crushing mechanism, the disintegrator and the conveyer means.

2. A machine for preparing road paving material, comprising a pan, crushing mechanism in the pan, means for determining the quantity of earthy or granular material to be deposited in the pan, means for receiving a binder and indicating the quantity thereof and for discharging the binder into the mixer, a motor mounted on the machine and connected to operate the crushing mechanism and effect the thorough grinding and kneading of the earthy or granular material and the mixture therewith of such binder, a disintegrator mounted on the machine, connections between the motor and the disintegrator to operate the latter, and means to effect the discharge of the mixed material from the pan into the disintegrator to effect the thorough pulverization of the mixture.

3. A machine for preparing road paving material, comprising a pan, crushing mechanism in the pan, means for determining the quantity of earthy or granular material to be deposited in the pan, means for receiving a binder and indicating the quantity thereof and for discharging the binder into the mixer, a motor mounted on the machine and connected to operate the crushing mechanism and effect the thorough grinding and kneading of the earthy or granular material and the mixture therewith of such binder, a disintegrator mounted on the machine, connections between the motor and the disintegrator to operate the latter, means to effect the discharge of the mixed material from the pan into the disintegrator to effect the thorough pulverization of the mixture, a conveyer to receive the pulverized product from the disintegrator and convey it to the point of discharge at one side of the machine, and means to transmit power from the motor to said conveyer.

4. A machine for preparing road paving material comprising a pan, crushing mechanism in the pan, means for measuring and dumping earthy or granular material into the pan, a receptacle for a binder and for indicating the quantity thereof and for discharging the binder into the mixer, means for charging the binder receptacle, a motor mounted on the machine and connected to operate the crushing mechanism and effect the thorough grinding of the earthy or granular material and the mixture therewith of the binder, a disintegrator mounted on the machine, connections between the motor and the disintegrator to operate the latter, means to effect the discharge of the mixed material from the pan into the disintegrator to effect the thorough pulverization of the mixture, a conveyer to receive the pulverized product from the disintegrator and convey it to the point of discharge at one side of the machine, and means to transmit power from the motor to said conveyer.

5. A machine for preparing road paving material, comprising a wheeled frame, a motor mounted thereon, a countershaft suitably supported from the frame, connections for transmitting power from the motor to the countershaft, a pan mounted on the frame, crushing mechanism in the pan, means for transmitting power from the countershaft to operate the crushing mechanism, means for receiving and indicating the quantity of earthy or granular material and for charging the pan therewith, means for receiving and indicating the quantity of liquid binder and for charging the pan with such binder, a plurality of disintegrating rollers, means for gathering up the mixed material from the pan and feeding it into the disintegrating rollers, and means for transmitting power from the countershaft to the disintegrating rollers.

6. A machine for preparing road paving material, comprising a wheeled frame, a motor mounted thereon, a countershaft suitably supported from the frame, connections for transmitting power from the motor to the countershaft, a pan mounted on the frame, crushing mechanism in the pan, means for transmitting power from the countershaft to operate the crushing mechanism, means for receiving and indicating the quantity of earthy or granular material and for charging the pan with such material, means for receiving and indicating the quantity of liquid binder and for charging the pan with such binder, a plurality of disintegrating rollers, means for gathering up the mixed material from the pan and feeding it into the disintegrating rollers, means for transmitting power from the countershaft to the disintegrating rollers, a conveyer underlying the disintegrating rollers to receive the material therefrom, and means for transmitting power from the counter shaft to said conveyer.

7. A machine for preparing road paving material, comprising a wheeled frame, a motor mounted on said frame, a countershaft suitably journaled and driven by said motor, a vertical shaft, a circular pan carried by said shaft, means for transmitting power from the countershaft to said vertical shaft to rotate the pan, crushing wheels or mullers depending into the pan for crushing and kneading material within the latter under frictional contact with such material produced by rotation of the pan, scrapers within the pan to deflect the material to a position for effective contact with said mullers, means for elevating the material from the pan and discharging it over its wall at the front side thereof, a disintegrator mounted on the frame to receive the material discharged from the pan, means for transmitting power from the counter shaft to the disintegrator, a laterally extending conveyer at one end underlying the disintegrator and adapted to discharge the material received therefrom at one side of the machine, an upwardly and outwardly inclined conveyer to receive material at its lower end from the discharge end of the first-named conveyer and discharge it at its upper end, means to transmit power from the countershaft to the inclined conveyer, and means to transmit power from the latter to the first-named conveyer.

8. A machine for preparing paving material, comprising a mixer, a vertical frame mounted on the machine, a track carried by said frame, a measuring device arranged to travel on said track and to charge the mixer with a predetermined quantity of earthy or granular material, a measuring device provided with a cup for discharging a liquid binder into the mixer, a motor mounted on the machine and connected to operate the mixer and effect the thorough grinding of the earthy or granular material and the mixture therewith of the binder, a disintegrator mounted on the machine, connections between the motor and the disintegrator to operate the latter, and means to effect the automatic discharge of the mixed material from the mixer into the disintegrator to effect the thorough pulverization of the mixture.

9. A machine for preparing paving material, comprising a mixer, a vertical frame mounted on the machine, a track carried by said frame, a measuring device arranged to travel on said track and to charge the mixer with a predetermined quantity of earthy or granular material, a measuring device provided with a cup for discharging a binder into the mixer, a motor mounted on the machine and connected to operate the mixer and effect the thorough grinding of the earthy or granular material and the mixture therewith of the binder, a disintegrator mounted on the machine, connections between the motor and the disintegrator to operate the latter, means to effect the automatic discharge of the mixed material from the mixer into the disintegrator to effect the thorough pulverization of the mixture, a conveyer to receive the pulverized product from the disintegrator and convey it to the point of discharge at one side of the machine, and means to transmit power from the motor to said conveyer.

10. A machine for preparing road paving material, comprising a mixer, a vertical frame mounted on the machine, a track carried by said frame, a weighing or measuring device arranged to travel on said track and to charge the mixer with a predetermined quantity of earthy or granular material, a weighing scale provided with a cup for discharging a liquid binder into the mixer, a pump for pumping liquid binder into said cup until it contains a predetermined quantity for discharge into the mixer, a motor mounted on the machine and connected to operate the mixer and effect thorough grinding of the earthy or granular material and the mixture of the binder therewith, a disintegrator mounted on the machine, connections between the motor and the disintegrator to operate the latter, means to effect the automatic discharge of the mixed material from the mixer into the disintegrator to effect the thorough pulverization of the mixture, a conveyer to receive the pulverized product from the disintegrator and convey it to the point of discharge at one side of the machine, and means to transmit power from the motor to said conveyer.

11. A machine for preparing road paving material, comprising a mixer, a vertical frame mounted on the machine, a track carried by said frame, a standard detachably secured to the rear end of the track and adapted to rest upon the ground, a weighing scale or measuring device arranged to travel on said track, and to charge the mixer with predetermined quantities of earthy or granular material, a weighing scale provided with a cup for discharging a binder into the mixer, a motor mounted on the machine and connected to operate the mixer and effect the thorough grinding of the earthy or granular material and the mixture therewith of the binder, a disintegrator mounted on the machine, connections between the motor and the disintegrator to operate the latter, means to effect the automatic discharge of the mixed material from the mixer into the disintegrator to effect the thorough pulverization of the mixture, a conveyer to receive the pulverized product from the disintegrator and convey it to the point of discharge at one side of the machine, and means to transmit power from the motor to said conveyer.

12. A machine for preparing paving material, comprising a pan, means within the pan for coöperating with the same in crushing and kneading material therein, a disintegrator, means to operate the said crushing and kneading mechanism and the said disintegrator, means to deliver a measured quantity of earthy material to said pan, and means to deliver binding material to said pan in quantity proportioned to the quantity of earthy material delivered to said pan.

13. A machine for preparing paving material, comprising a pan, means within the pan for coöperating with the same in crushing and kneading material therein, a disintegrator, means to operate the said crushing and kneading mechanism and the said disintegrator, means to deliver a measured quantity of earthy material to said pan, means to deliver binding material to said pan in quantity proportioned to the quantity of earthy material delivered to said pan, and means to automatically deliver kneaded material from said pan to said disintegrator.

In testimony whereof I affix my signature in presence of two witnesses.

CALVERT R. HUNT.

Witnesses:
  D. J. DOWNEY,
  G. Y. THORPE.